(12) United States Patent
Ganesan et al.

(10) Patent No.: US 9,361,466 B2
(45) Date of Patent: Jun. 7, 2016

(54) PRINTER CONSUMABLE LOCKING (71) Applicant: Hewlett-Packard Development Company, L.P., Houston, TX (US)

(72) Inventors: Kumaravel Ganesan, Bangalore (IN); Palanikumar Thangapandian, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 394 days.

(21) Appl. No.: 13/723,714

(22) Filed: Dec. 21, 2012

(65) Prior Publication Data

US 2014/0177007 A1    Jun. 26, 2014

(51) Int. Cl.
  *G06F 21/00* (2013.01)
  *G06F 21/60* (2013.01)
  *G06F 21/84* (2013.01)

(52) U.S. Cl.
  CPC .............. *G06F 21/608* (2013.01); *G06F 21/84* (2013.01)

(58) Field of Classification Search
  CPC .................................................. G06Q 2250/70
  USPC ......................................................... 705/408
  See application file for complete search history.

(56) References Cited

U.S. PATENT DOCUMENTS

| 6,378,070 | B1 |  | 4/2002 | Chan |
| 7,020,781 | B1 | * | 3/2006 | Saw et al. ........................ 705/51 |
| 7,305,556 | B2 | * | 12/2007 | Slick et al. ..................... 713/169 |
| 7,308,572 | B2 | * | 12/2007 | Goh et al. ...................... 713/152 |
| 7,515,291 | B2 | * | 4/2009 | Simpson ............... G06F 3/1219 358/1.1 |
| 8,041,952 | B2 |  | 10/2011 | Parry |
| 2003/0014640 | A1 |  | 1/2003 | Loyd |
| 2005/0060546 | A1 | * | 3/2005 | Parry ................... B41J 2/17546 713/171 |
| 2005/0268090 | A1 | * | 12/2005 | Saw ....................... G06F 21/608 713/156 |
| 2008/0181713 | A1 | * | 7/2008 | Ogle ....................... B41J 29/56 400/693 |

OTHER PUBLICATIONS

Maykin Warasart & Pramote Kuacharoen, Paper-based Document Authentication using Digital Signature and QR Code, 4th Int'l Conference on Computer Engineering & Technology, 2012, 94-98, IPCSIT vol. 40, IACSIT Press, Singapore.

* cited by examiner

*Primary Examiner* — Charles C Agwumezie
(74) *Attorney, Agent, or Firm* — Law Office of Robert C. Sismilich (57) ABSTRACT

In one example, a printer consumable is locked to a content provider. A document that includes content restricted by a provider is printed if the printer consumable is installed in the printer.

14 Claims, 6 Drawing Sheets

PRINTER CONSUMABLE LOCKING

BACKGROUND

Printers are used in a wide variety of applications to produce output on media. The media typically is a suitable sheet or roll material, such as paper, card stock, cloth or other fabric, transparencies, mylar, and the like. The printer produces the output by controllably emitting a colorant at desired positions or locations on the media.

The colorant is a consumable: an item that is used up or worn out after a period of time, or after an amount of use, in the output producing process. As such, the consumable is typically replaced or replenished over the lifetime of the printer, in most cases many times. A colorant such as ink or toner may be supplied in a replaceable item, such as an ink container or a toner cartridge. In some cases, the container or cartridge may include other items ancillary to the colorant, such as a printhead or a photosensitive drum, which get replaced along with a supply of colorant.

Replacement or replenishment of consumables is an expense for the owner of the printer. Naturally, a printer owner typically desires to minimize these recurring expenses.

DETAILED DESCRIPTION

As noted in the Background section, a printer owner typically desires to minimize the recurring expense of replacement or replenishment of printer consumables. For example, an enterprise content provider, such as for example a corporation or a government body or agency, may wish to restrict the use of some or all of the enterprise's printers to printing only business-related content that is provided or generated within the enterprise, thus conserving the consumables. In addition, such an enterprise may further desire to limit the printers on which business-related content may be printed to limit access to the content or to secure it.

Some other content providers—such as, for example, newspaper or magazine publishers—may wish to electronically distribute content to users but desire to have the subscriber print the received content. For example, a printed copy of a magazine may be passed around by the subscriber to his friends and family after he has read it, but the electronic content may be locked to the subscriber and thus not forwardable to others. If advertising rates for advertisements included in the content, for example, are set based on the number of readers, the content provider has an incentive to ensure that their subscribers print a hardcopy of the content and thus get a wider audience to view the ads. One way the content provider can encourage printing is for the content provider to subsidize the cost of the consumables used to print the content. But at the same time, to minimize consumable costs, the content provider desires that its subsidized consumables be used to print only content from the content provider.

Today, an increasing amount of content is printed using cloud-based printing services. With such services, a user can register his or her printer with the service, and then send to the cloud from a variety of devices—including personal computers, laptops, smart phones, personal digital assistants, to name but a few—the content they wish to print. The cloud-based printing service will render the print content if and as appropriate, and send it to the registered printer, on which the content will be printed. Existing cloud-based printing services, however, do not have a mechanism that can lock consumables installed in a printer to a specific content provider, so as to restrict printing of documents by the printer to documents which are associated with that content provider.

The present disclosure discloses printing techniques and systems which lock one or more printer consumables to a content provider. When these consumables are installed in a printer, the printer will print documents which include content that is restricted by that content provider, but not print other documents. By limiting printer operation to printing specific content, the content provider can advantageously conserve consumables and reduce the providers cost of consumables.

Referring now to the drawings, there are illustrated examples of a printing system constructed in accordance with the present disclosure which locks one or more printer consumables to a content provider. Considering now one example printing system, and with reference to FIG. 1, a printing system 100 includes a printing service 120 communicatively coupled to a printer 130. The printer 130 includes one or more printer consumables 132 that are locked to a particular content provider. The printing service 120 is typically cloud-based. As defined herein and in the appended claims, a "cloud-based service" shall be broadly understood to mean a service that is accessible from a computing device over a network such as the Internet.

Figure 1:
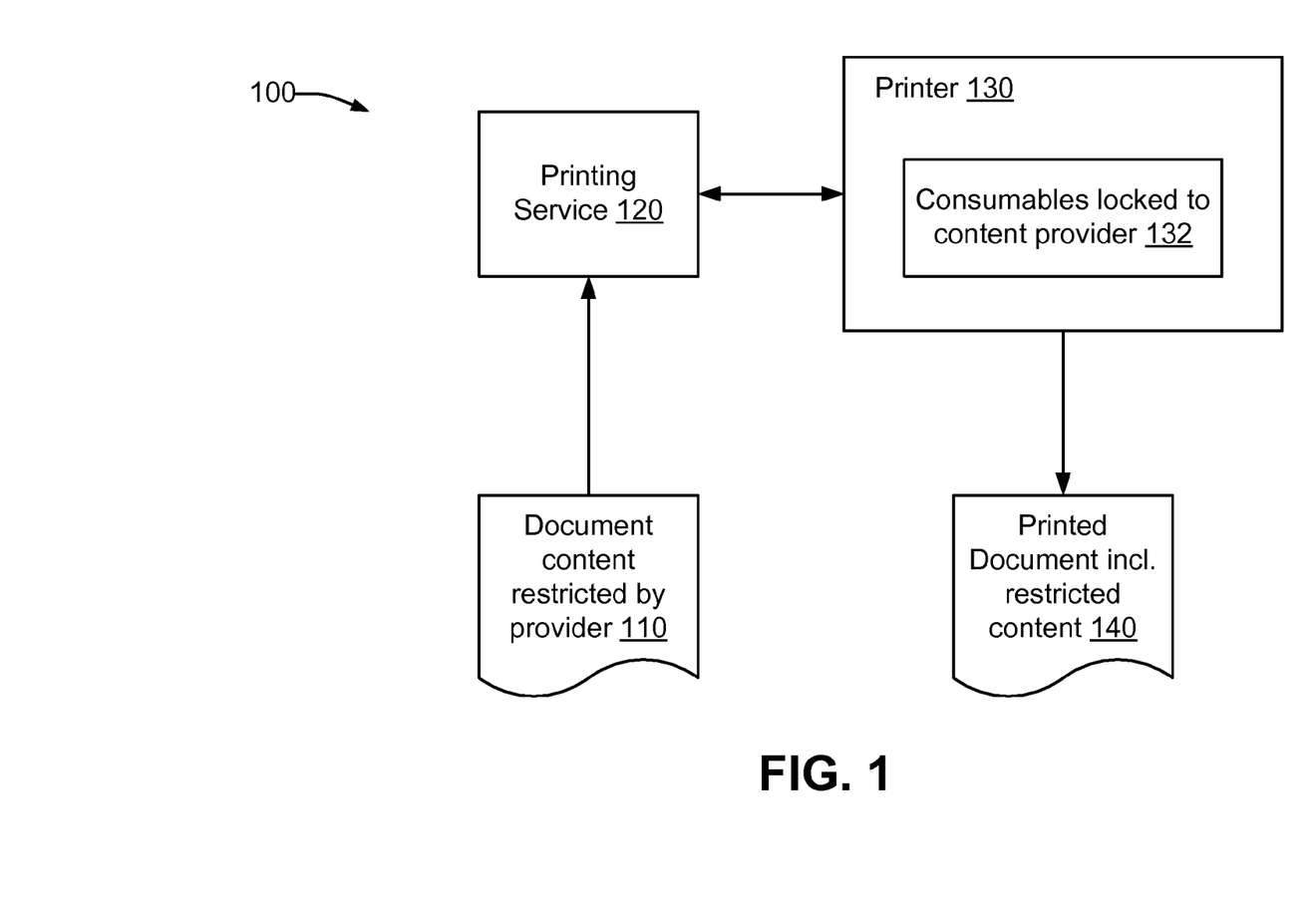
FIG. 1 is a schematic representation of a printing system in accordance with an example of the present disclosure.

The printing service 120 is structured to receive over the network a request to print, on a specified printer, a document 110 that includes content which is restricted by the content provider. By way of example and not limitation, the document 110 may be, or may include, one or more of an email, a webpage, an advertisement, a file in any of a variety of formats, etc. The printing service 120 and the printer 130 interoperate to determine whether or not the printer consumables 132 installed in the printer 130 are locked to the content provider associated with the restricted content in the document 110. If the printer consumables 132 installed in the printer 130 are locked to the content provider associated with the restricted content in the document 110, then the document 110 is printed on the printer 130 to generate the printed output document 140 that includes the restricted content. However, if the printer consumables 132 installed in the printer 130 are not locked to the content provider associated with the restricted content in the document 110, then the document 110 is not printed on the printer 130. For example, the document 110 is not printed if the printer consumables 132 installed in the printer 130 are locked to a different content provider, or if the printer consumables 132 installed in the printer 130 are unlocked (i.e. not locked to any content provider).

In one example, all of the consumables 132 are locked to the same provider.

Figure 2:
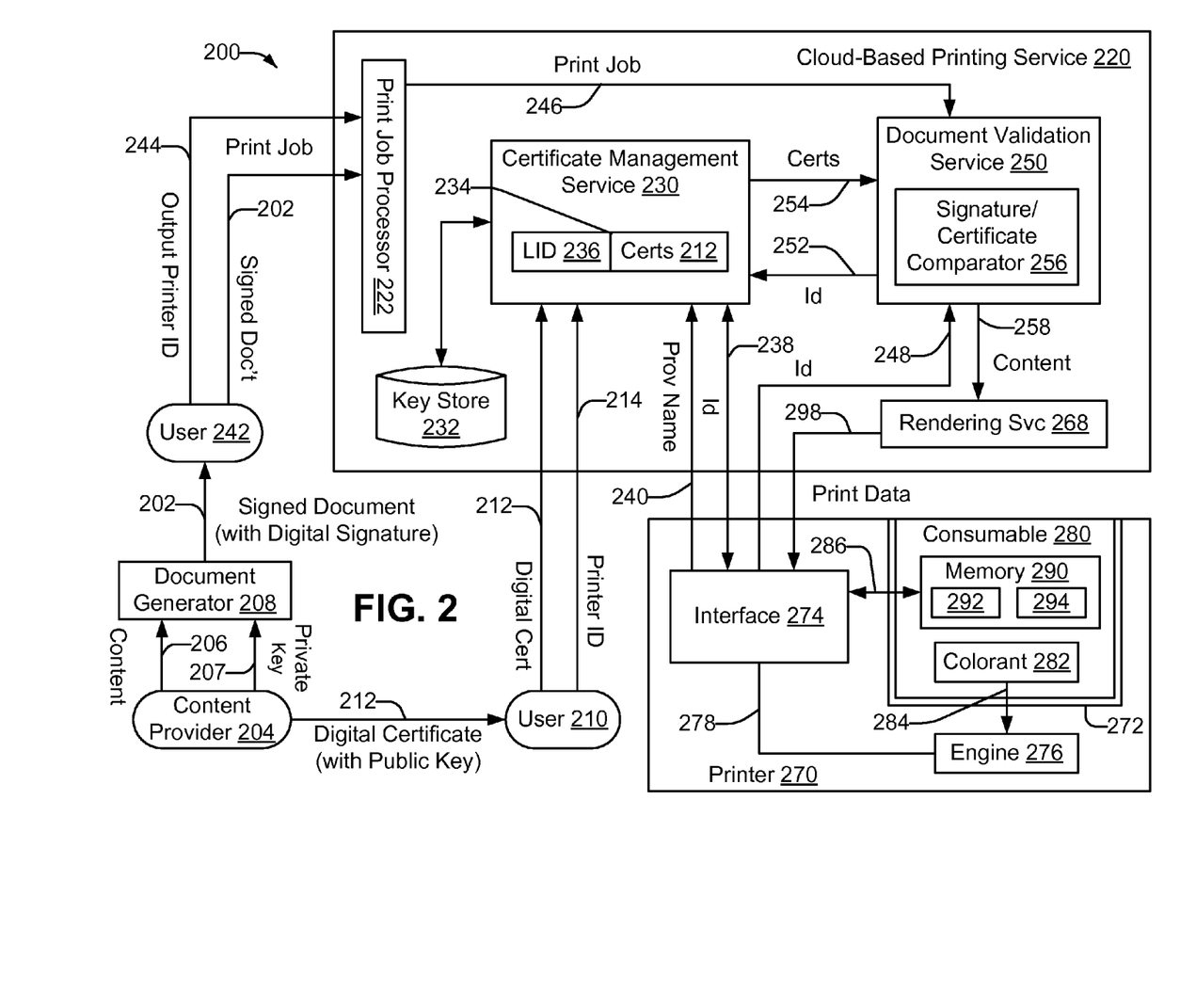
FIG. 2 is a schematic representation of another printing system in accordance with an example of the present disclosure.

Considering now another example printing system, and with reference to FIG. 2, a printing system 200 includes a cloud-based printing service 220 communicatively coupled to a printer 270. The printing service 220 and the printer 270 are configured to allow print jobs received by the printing service 220 that include document content restricted by a content provider to be printed on the printer 270 if a printer consumable locked to the content provider is installed in the printer 270.

Before considering the cloud-based printing service 220 and the printer 270 in greater detail, consider a signed document 202 having content restricted by a content provider. Content provider 204 provides and identifies content 206 that is to be restricted. In one example, the content 206 is restricted by the inclusion of a digital signature in the signed document 202. As defined herein and in the appended claims, a "digital signature" shall be broadly understood to mean an item of cryptographic information included in a signed document through which the origin and content of a document, and the name (identity) of the content provider, may be obtained, verified, and/or authenticated. In some examples, the digital signature is an encrypted hash of some or all of the document content. A hash function is applied to the document content or portion thereof, and the hashed output is then encrypted to form the digital signature. The encryption operation may be performed via public-key cryptography using a private key of the content provider. The identity of the content provider can be obtained from the signed document 202 by decrypting the digital signature. Where the digital signature has been encrypted via public-key cryptography using the private key of the content provider, the decryption may be performed using the corresponding public key of the content provider. In some examples, the signed document 202 may be verified or authenticated by (a) hashing the document content or portion thereof using the same hash function used to generate the digital signature, (b) decrypting the digital signature using the public key of the content provider, and (c) comparing the results. If the two results are the same, then the digital signature has been successfully authenticated. A successful authentication confirms that the public key used in the authentication process corresponds to the private key used to encrypt the digital signature.

The signed document 202 may be generated by a document generator 208 that receives from the content provider 204 the content 206 and the providers private key 207. Since the content provider 204 has restricted printing of the signed document 202 to those printers, such as printer 270, in which consumables locked to the content provider 204 have been installed, the content provider 204 then distributes to one or more authorized users, such as user 210, a digital certificate 212 that includes the public key of the content provider. The user 210 can upload the digital certificate 212 to the printing service 220 for use in determining whether a particular signed document 220 can be printed on a particular printer 270, as will be discussed subsequently in greater detail.

Considering now the printer 270 in greater detail, the printer 270 includes a consumable receptacle 272, an interface 274, and a print engine 276. The receptacle 272 is structured to receive at least one consumable 280. Each consumable 280 provides a supply 282 of at least one colorant. The colorant(s) are delivered 284 to the print engine 276, which controllably emits the colorant onto a print medium (not shown) in a desired pattern during a printing operation to form the text, graphics, images, etc. of the printed output. The consumable 280 also includes a memory 290. The memory 290 includes identifier storage 292 for storing a locking identifier, and name storage 294 for storing a provider name which identifies a content provider that provided the consumable 280. The interface 274 controls 278 the operation of the print engine 276 responsive to print data 298 received from the printing service 220. The interface 274 also accesses 286 the memory 290, including reading data from and writing data to memory locations. For example, the interface 274 reads and writes the locking identifier from and to the identifier storage 292, and reads and writes the provider name from and to the name storage 294. In some examples, some or all of the storage locations in the memory 290 can be written to once, but read many times. The interface 274 may access the identifier storage 292 and the name storage 294 as part of interactions between the printing service 220 and the printer 260 as will be explained subsequently.

Considering now the cloud-based printing service 220 in greater detail, the printing service 220 includes a print job processor 222, a certificate management service (CMS) 230, a key store 232, a document validation service (DVS) 250, and a rendering service 268. The printing service 220 has a portal (not shown) that is adapted to receive from the user 210 the digital certificate 212 of the content provider 204, along with a printer identifier (printer ID) 214 that identifies one or more printers 270 that are associated with the user 210 and on which the user 210 may wish to print signed documents 202 of the content provider 204. The printers 270 that are associated with user 210 have typically been pre-registered. An individual user 210 may be associated, for example, with one or a few printers 270. In a corporate environment, however, the user 210 may be an administrator who manages a large fleet of printers for the corporation. The printer ID 214 may specify all or a subset of the printers 270 that are associated with the user 210 as ones on which signed documents 202 of the content provider 204 are desired to be printed. It can be appreciated that a large number and variety of users 210 and printers 270 can be pre-registered with, and utilize, the printing service 220.

Considering now the CMS 230 in greater detail, the CMS 230 is structured to associate a digital certificate 212 of a content provider 204 with a unique locking identifier 236 that relates the certificate 212 to a particular consumable 280 that is removably installed in a printer 270. The resulting association 234 between the digital certificate 212 and the locking identifier 236 is stored in a database (not shown) in the key store 232, along with the digital certificate 212 itself.

Figure 3:
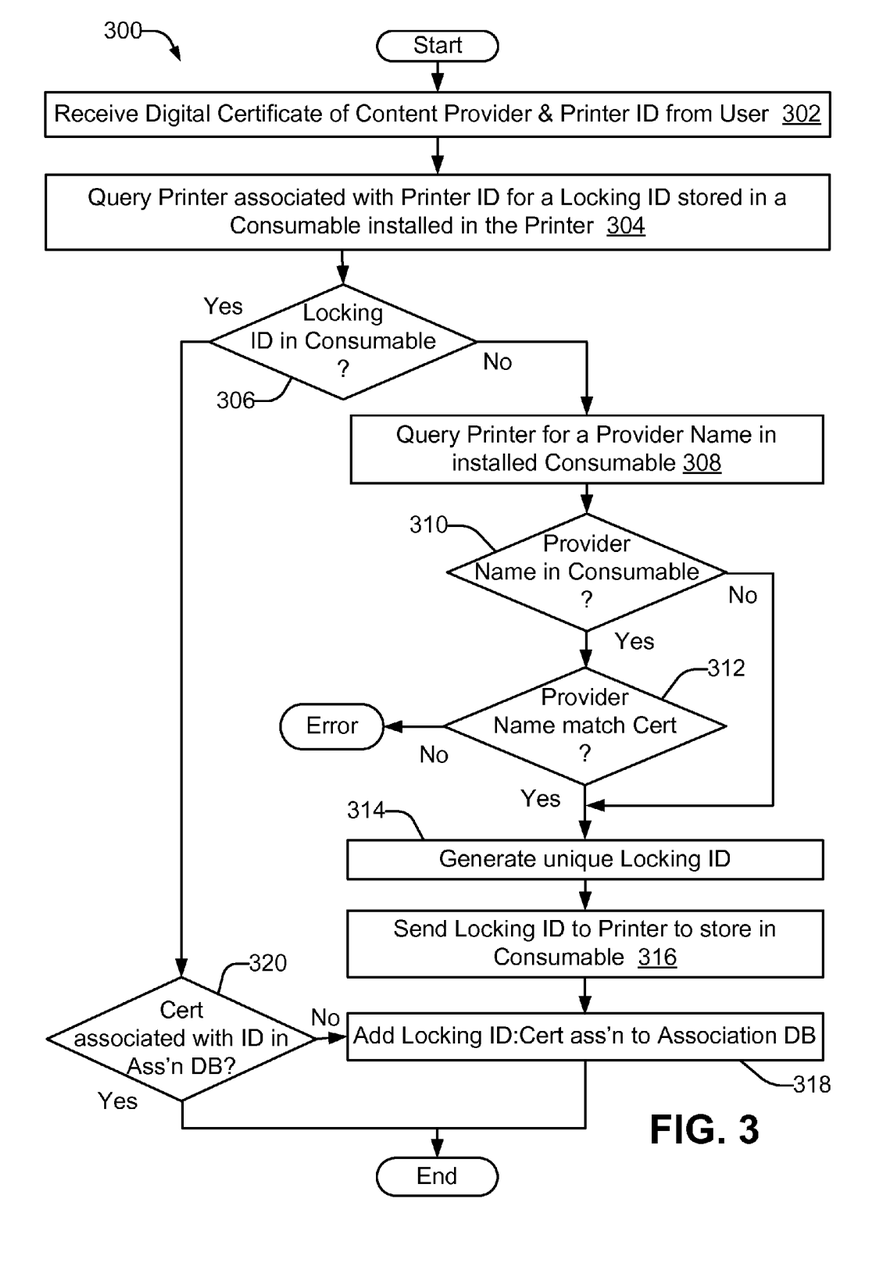
FIG. 3 is a flowchart in accordance with an example of the present disclosure of a method of locking a printer consumable to a content provider using the system of FIG. 2.

Considering now the association 234 between the digital certificate 212 and the locking identifier 236 in greater detail, and with reference to the method 300 of FIG. 3 along with the schematic representation of FIG. 2, at 302 the digital certificate 212 and the printer ID 214 sent by the user 210 to the printing service 220 are received at the CMS 230 via the portal. For simplicity of illustration, assume that the printer ID 214 identifies a single printer 270. At 304, the printer 270 that is associated with the printer ID 214 is queried to read the contents of the identifier storage 292 of a consumable 280 installed in the printer 270. The contents of the identifier storage 292 determine whether the consumable 280 is locked to a particular content provider 204, or whether the consumable 280 is unlocked. In some examples, a particular value of the contents may be reserved to indicate that the consumable 280 is unlocked. Any other value of the contents indicates that the consumable 280 is locked, and the value constitutes the locking ID 236. The contents of the identifier storage 292 are returned from the interface 274 of the printer 270 to the CMS 230 via path 238.

If a locking ID does not exist ("No" branch of 306), this indicates that the consumable 280 is unlocked. At 308, the printer 270 that is associated with the printer ID 214 is queried to read the contents of the name storage 294 of the consumable 280 installed in the printer 270. The contents of the name storage 294 determine whether the consumable 280 is associated with a particular content provider 204, or whether the consumable 280 is not associated with any content provider 204. In some examples, a particular value of the contents may be reserved to indicate that the consumable 280 is not associated with any content provider 204. Any other value of the contents indicates the name of the content provider 204 (the "provider name") with which the consumable 280 is associated. In some examples, the provider name is prestored in the name storage 294 by the manufacturer of the consumable 280 at the time the consumable 280 is purchased by the content provider 204 from the manufacturer. The contents of the name storage 294 are returned from the interface 274 of the printer 270 to the CMS 230 via path 240.

If the consumable 280 contains a provider name ("Yes" branch of 310), then at 312 it is determined whether the provider name in the consumable matches the name in the digital certificate 212 received from the content provider 204. If they do not match ("No" branch of 312), then an error occurs—because of the mismatch, the consumable 280 cannot be locked to the content provider 204 of the digital certificate 212.

If the provider name in the consumable matches the name in the digital certificate 212 received from the user 210 ("Yes" branch of 312), or if the consumable 280 does not contain a provider name ("No" branch of 310), then at 314 the CMS 230 generates a unique locking ID 236. A unique locking ID 236 has a value that is different from every other locking ID in the key store database. At 316, the CMS sends the locking ID 236 to the interface 274 of the printer 270 via path 238, and the interface 274 writes the locking ID 236 into the identifier storage 292. In some examples, the user has the opportunity to accept or reject writing the locking ID 236 into the identifier storage 292. Writing the locking ID 236 has the effect of locking the consumable 280 to the content provider 204 and, as mentioned previously, the value in the identifier storage 292 can no longer be modified. This ensures that the consumable 280 cannot subsequently be unlocked, or locked to a different content provider. At 318, an association 234 between the locking ID 236 and the corresponding digital certificate 212 is formed, and this association 234 is stored in the database of the key store 232. The digital certificate 212 itself is also stored in the key store 232. At this point, the method 300 concludes.

If a locking ID 236 exists in the identifier storage 292 ("Yes" branch of 306), this indicates that the consumable 280 has previously linked to at least one digital certificate. At 320 it is determined whether the certificate 212 provided by the user 210 is already associated with that locking ID 236. If so, ("Yes" branch of 320), the method 300 concludes; there is no need to associate or store a duplicate certificate. If not ("No" branch of 320), then the method branches to 318 to form and store the association 234 and store the certificate 212. At this point, the method 300 concludes.

While FIG. 3 illustrates the case where the printer ID 214 identifies a single printer 270, it can be readily appreciated that, if the printer identifier 214 identifies more than one printer, the method 300 will loop from any of blocks 316, 314, or 320 back to block 304 for each additional printer until all printers identified by the printer identifier 214 have been processed.

In addition, FIG. 3 illustrates the case for a single consumable 280 installed in the printer 270. In some examples, the printer 270 may have installed a set of consumables 280. In this case, the contents of the identifier storage 292 of all of the consumables 280 are read at 304. In some examples the operations of blocks 306 through 320 are performed for each of the consumables 280 in the set. For example, these operations may be performed sequentially for each consumable 280 in the set. In some examples, the operation of block 306 is performed for all of the consumables 280 in the set and, if two or more different locking IDs 236 exist, an error occurs.

Before considering the document validation service (DVS) 250 in greater detail, and with continued reference to FIG. 2, consider first a user 242 who has obtained the signed document 202 and wishes to print it using the printing service 220. The user 242 may be the user 210, or may be a different user. The user 242 provides to the print job processor 222 of the printing service 220 a print job 246 that includes the signed document 202 and an identifier 244 of the printer on which the signed document 202 is to be printed. The identifier 244 may denote the printer 270, or a different printer registered with the printing service 220. In some example, the print job processor 222 may orchestrate or coordinate the operation of various aspects of the printing service 220 in processing and validating the print job 246, and rendering the print job into print data for the printer.

Now considering the DVS 250 in greater detail, the print job processor 222 provides the print job 246 to the DVS 250. The DVS 250 is structured to retrieve any locking identifier 236 from the consumable(s) 280 in the printer that corresponds to the printer identifier 244. If a locking identifier 236 exists, the DVS 250 is then further structured to determine whether the signed document 202 includes a digital signature that corresponds to a digital certificate that is associated with the locking identifier 236 in the printing service 220. If such an associated digital certificate exists, the DVS 250 allows the print job to be printed on that printer.

Figure 4:
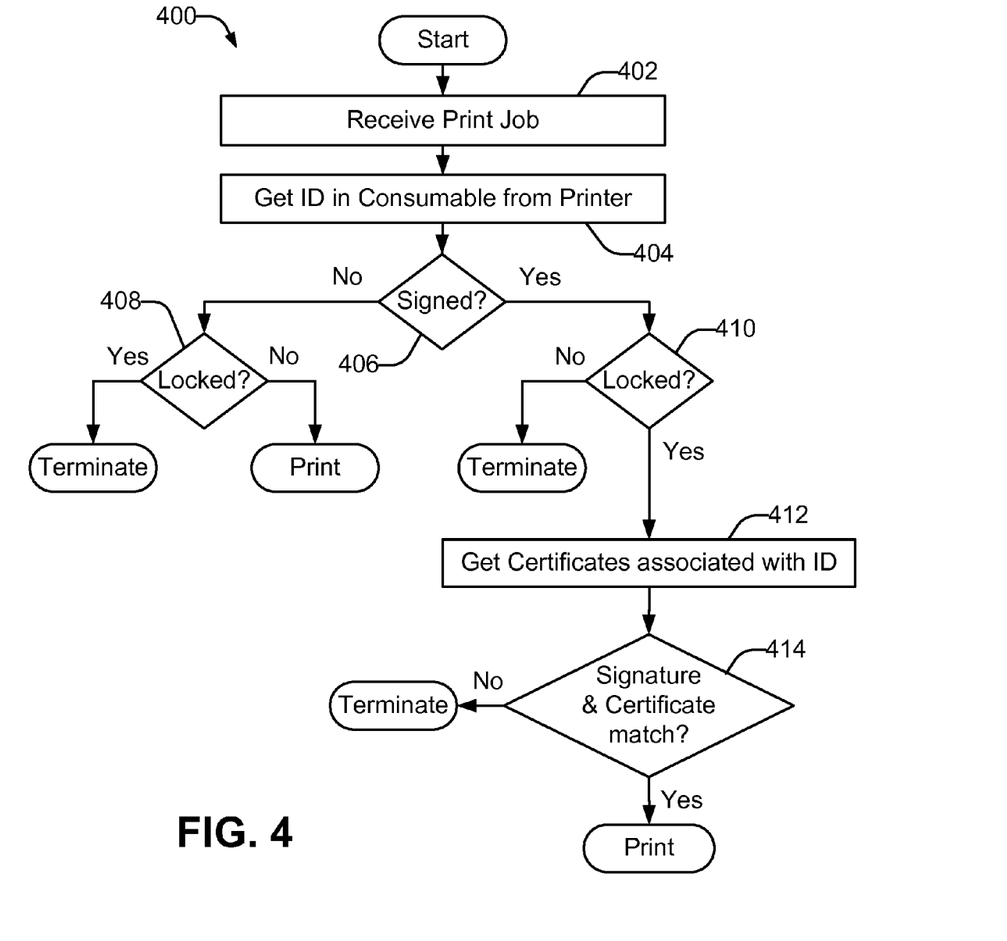
FIG. 4 is a flowchart in accordance with an example of the present disclosure of a method of determining whether to print a print job using the system of FIG. 2.

Considering now the structure and operation of the DVS 250, including its interactions with the CMS 230 and the printer 270 in greater detail, and with reference to the method 400 of FIG. 4 along with the schematic representation of FIG. 2, at 402 the print job 246 is received at the DVS 250. At 404, the printer 270 that is associated with the output printer identifier (OPID) 244 is queried by the DVS 250 to read the contents of the identifier storage 292 of a consumable 280 installed in the printer 270. These contents, as has been described heretofore, determine whether the consumable 280 is locked to a particular content provider 204 via a locking ID 236, or whether the consumable 280 is unlocked. The contents of the identifier storage 292 are returned from the interface 274 of the printer 270 to the DVS 250 via path 248.

It can be appreciated that the printing service 202 may receive from user 242 an alternative print job 246 that instead includes an unsigned document that does not include a digital signature. In this regard, at 406, the DVS 250 determines whether or not the print job 246 includes a signed document, such as signed document 202.

If the print job does not include a signed document but rather an unsigned document ("No" branch of 406), then at 408 further action is taken based on whether the consumable 280 is locked or unlocked. If the consumable 280 is locked to a particular content provider 408 ("Yes" branch of 408), then the print job 246 will be terminated without being printed. In this manner, the consumable(s) 280 in the printer 270 that are locked to a particular content provider 204 are conserved since they will not be used to print a document that is not associated with that content provider 204 (i.e. a document that is not signed with the digital signature of the content provider 204). Appropriate feedback (not shown) that the print job will not be printed is typically communicated to the user 242. However, if the consumable 280 is unlocked ("No" branch of 408), then the print job 246 containing the unsigned document is printed on the printer 270, since there are no restrictions on either the content of the document or the use of the consumable(s) installed in the printer 270.

If the print job includes a signed document ("Yes" branch of 406), then at 410 further action is taken based on whether the consumable 280 is locked or unlocked. If the consumable 280 is unlocked ("No" branch of 410), then the print job 246 will be terminated without being printed. In this manner, the unlocked consumable(s) 280 in the printer 270 prevent the printer from printing a document which includes content that is restricted by a content provider 204 (i.e. a document that is signed with the digital signature of the content provider 204). This provides a security mechanism that helps ensure that restricted content is not printed on unauthorized printers (i.e. printers that have unlocked consumable(s) installed, rather than consumables that are locked to the content provider). Appropriate feedback (not shown) that the print job will not be printed is typically communicated to the user 242.

If the consumable 280 is locked ("Yes" branch of 410), then at 412 the DVS 250 obtains the digital certificates 212 that are associated 234 with the locking ID 236. In some examples, the DVS 250 interacts with the CMS 230 in order to obtain the certificates. The DVS sends the locking id 236 obtained at 404 to the CMS 230 via path 252. The CMS 230 then accesses the association database in the key store 232. The database is searched for the locking id 236, and identifies the one or more digital certificates 212 that are associated with the locking id 236. Those associated digital certificates 212 are then obtained from the key store 232 and returned from the CMS 230 to the DVS 250 via path 254. In other examples, the DVS 250 may access the key store 232 directly in order to obtain the digital certificates 212.

At 414, a digital signature/digital certificate comparator 256 in the DVS 250 compares individual ones of the digital certificates 212 to the digital signature of the signed document 202 until a match is found, or until all of the digital certificates 212 have been compared to the digital signature of the signed document 202 with no match found. In some examples where the digital signature has been encrypted via public-key cryptography using the private key of the content provider, the comparator 256 attempts to cryptographically verify or authenticate the digital signature of the document 202 using an individual digital certificate 212 as has been described heretofore. Alternatively or additionally, the comparator 256 may compare the identity of the content provider in the digital signature to the identity of the content provider of the digital certificate If a match is not found ("No" branch of 414), it indicates that the signed document 202 was signed by a different content provider 204 from the one to which the consumable(s) 280 in the printer 270 are locked, and the print job 246 will be terminated without being printed. This provides a security mechanism that helps ensure that content restricted by one content provider 204 is not printed on unauthorized printers (i.e. printers that have consumable(s) locked to a different content provider installed). It also conserves the consumable(s) supplied by the content provider to which the consumables are locked by disallowing content of other providers to be printed using those consumables. Appropriate feedback (not shown) that the print job will not be printed is typically communicated to the user 242.

If a match is found ("Yes" branch of 414), it indicates that the signed document was signed by the same content provider 204 to which the consumable(s) 280 in the printer 270 are locked, and the document 202 will be printed by the printer 270. The DVS 250 sends the document content to the rendering service 268 via path 258. The rendering service 268 renders the content appropriately to generate print data 298 which is sent to the interface 274 of the printer 270 for printing as hardcopy output by the print engine 276.

FIG. 4 illustrates the case for a single consumable 280 installed in the printer 270. In some examples, the printer 270 may have installed a set of consumables 280. In this case, the contents of the identifier storage 292 of all of the consumables 280 are read at 404. In some examples the operation of blocks 406 through 414 are performed for each of the consumables 280 in the set. In this case, the document will be printed by the printer 270 if all of the consumables in the set meet the criteria for printing (i.e. via the "No" branch of 408, or the "Yes" branch of 414).

Returning now to the cloud-based printing service 220, and with continued reference to FIG. 2, the various elements of the printing service 220 may be distributed in whole or in part among various servers and other computing resources of the network, such as the Internet. For example, the CMS 230 may reside on a first server or set of servers, the DVS 250 on a second server or set of servers, the rendering service 268 on a third server or set of servers. The various servers and computing resources communicate and interoperate with each other according to a variety of communication protocols usable with the network. The printer 270 may be connected directly to the network of the printer service 220, or alternatively may be connected through an intermediary such as for example a personal computer that is connected to the network of the printer service 220. The various elements of the printing service 220, such as the CMS 230, the DVS 250, the rendering service 268, etc., may be implemented in whole or in part in software or firmware instructions that are stored in at least one memory of at least one computer system and executed by at least one processor communicatively coupled to the at least one memory.

Figure 5A:
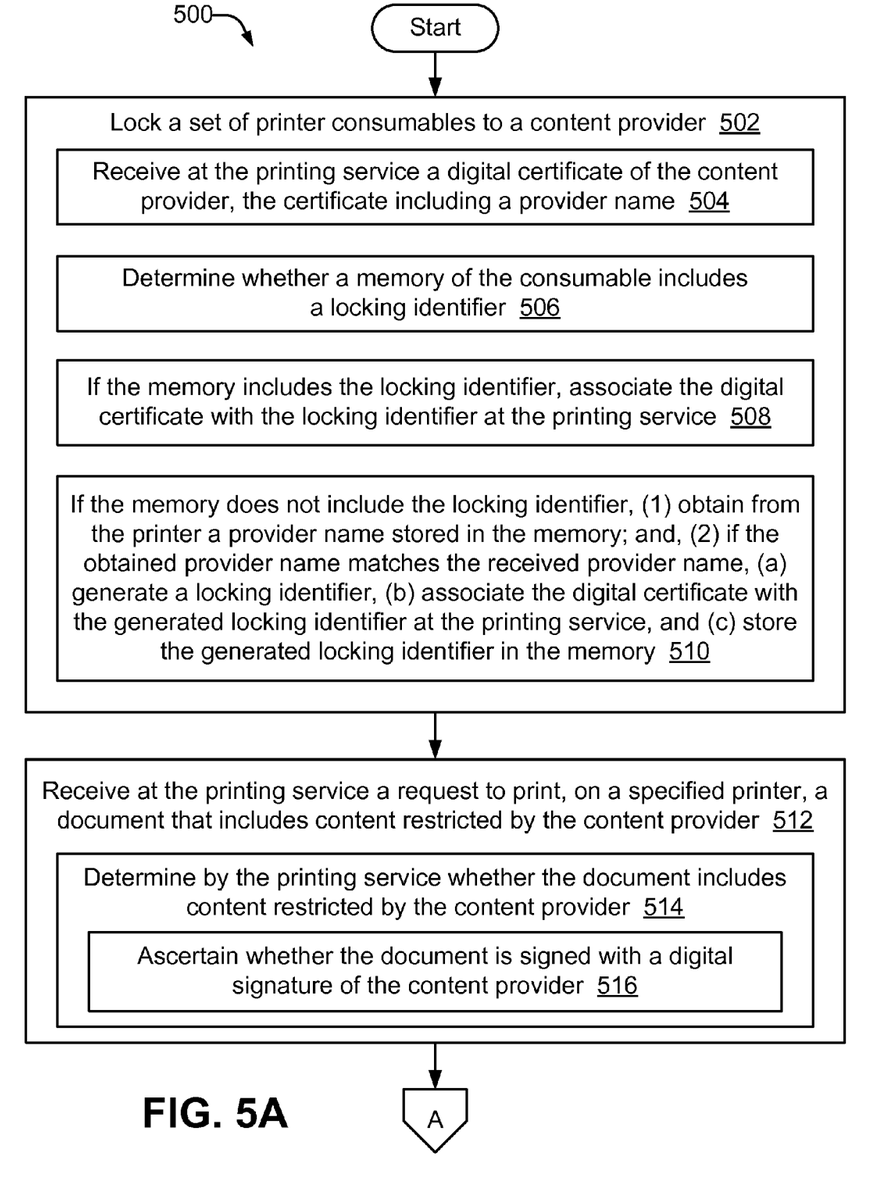
FIGS. 5A-B are flowcharts in accordance with an example of the present disclosure of a method of printing with the system of FIG. 1 or FIG. 2.
Figure 5B:
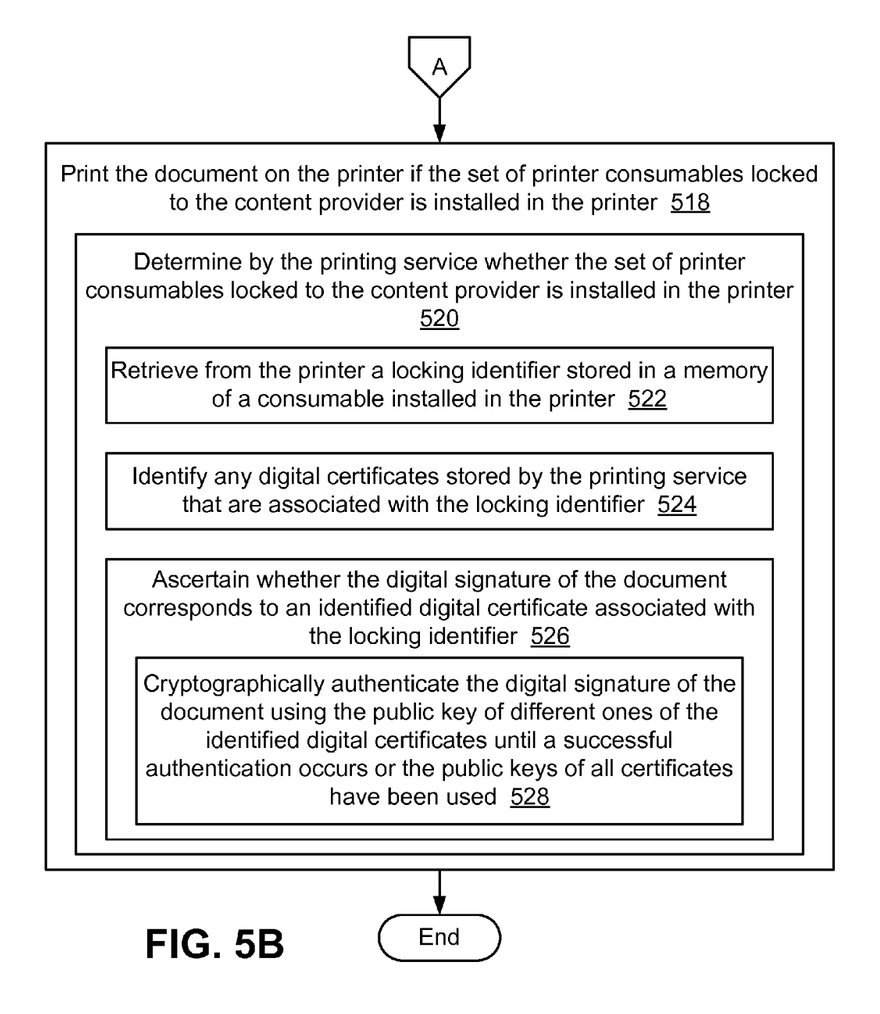

Consider now, with reference to FIGS. 5A-5B, a flowchart of a cloud-based printing service, such as the printing service 220. Alternatively, the flowchart of FIGS. 5A-5B may be considered as steps in a printing method implemented in one or more servers or computing resources. The flowchart or method 500 begins at 502 by locking a set of printer consumables to a content provider. At 512, a request to print, on a specified printer, a document that includes content restricted by the content provider is received at the printing service. At 518, the document is printed on the printer if the set of printer consumables locked to the content provider is installed in the printer.

In some examples of the locking 502, a digital certificate of the content provider, the certificate including a provider name is received at the printing service at 504. At 506, it is determined whether a memory of the consumable includes a locking identifier. At 508, if the memory includes the locking identifier, the digital certificate is associated with the locking identifier at the printing service. At 510, if the memory does not include the locking identifier, then a provider name stored in the consumable memory is obtained from the printer. If the obtained provider name matches the received provider name, then (a) a locking identifier is generated, (b) the digital certificate is associated with the generated locking identifier at the printing service, and (c) the generated locking identifier is stored in the memory.

In some examples of the receiving 512, the printing service determines whether the document includes content restricted by the content provider at 514. In some examples, the determination is made at 516 by ascertaining whether the document is signed with a digital signature of the content provider.

In some examples of the printing 518, the printing service determines at 520 whether the set of printer consumables locked to the content provider is installed in the printer. In some examples of the determining 520, a locking identifier stored in a memory of a consumable installed in the printer is retrieved from the printer at 522. Any digital certificates stored by the printing service that are associated with the locking identifier are identified at 524. At 526, it is ascertained whether the digital signature of the document corresponds to an identified digital certificate associated with the locking identifier. In some examples, the ascertaining 526 includes, at 528, cryptographically authenticating the digital signature of the document using the public key of different ones of the identified digital certificates until a successful authentication occurs or the public keys of all certificates have been used.

From the foregoing it will be appreciated that the printing service, printer, and methods provided by the present disclosure represent a significant advance in the art. Although several specific examples have been described and illustrated, the disclosure is not limited to the specific methods, forms, or arrangements of parts so described and illustrated. For example, examples of the disclosure are not limited to use with printers and consumables, but also encompass other types of electronic equipment in which a component supplied by a content provider can be installed and used to implement a locking mechanism that restricts use of the electronic equipment. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. Similarly, blocks in diagrams or numbers (such as 101, 102, etc.) should not be construed as steps that must proceed in a particular order. Additional blocks/steps may be added, some blocks/steps removed, or the order of the blocks/steps altered and still be within the scope of the disclosed examples. Further, methods or steps discussed within different figures can be added to or exchanged with methods or steps in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A server system, comprising:
    at least one processor; and
    at least one memory storing a cloud-based printing service executed by the at least one processor, the service including
        a certificate management system structured to query a printer to determine whether a particular consumable installed in the printer includes a unique locking identifier, and if not, to generate a unique locking identifier that relates a digital certificate of a content provider to the consumable, send the generated unique locking identifier to the printer for storage in a memory of the consumable, and associate the digital certificate with the unique locking identifier in the server system; and
        a document validation service structured to
            receive a print job to print a document on the printer,
            retrieve the unique locking identifier from the consumable,
            determine, using the unique locking identifier, whether the document includes a digital signature that corresponds to the certificate, and
            allow the print job to be printed on the printer using the consumable if the signature corresponds to the certificate.

2. The server system of claim 1, wherein the certificate management system is further structured to store the certificate, and an association of the certificate to the unique locking identifier, in a key store of the printing service.

3. The server system of claim 2, wherein the printing service is further structured to search the key store for the unique locking identifier, obtain the corresponding certificate using the association, and compare the certificate to the signature.

4. The server system of claim 2, wherein the certificate management service is further structured to receive a unique locking identifier from the document validation service, search the key store for the unique locking identifier, and retrieve all certificates associated with the unique locking identifier.

5. The server system of claim 1, wherein the document validation service is further structured to receive from the certificate management service all certificates associated with the unique locking identifier, and compare individual ones of the certificates to the signature until a match is found.

6. The server system of claim 1, wherein the certificate management system is further structured to:
    determine whether the memory of the consumable includes an unique locking identifier; and if the memory does not include a unique locking identifier, generate the unique locking identifier and send the unique locking identifier to the printer for storage in the memory of the consumable.

7. The server system of claim 6, wherein the certificate management system is further structured to obtain from the printer a provider name stored in the memory, and generate the unique locking identifier if the obtained provider name matches a provider name in the certificate.

8. The server system of claim 1, wherein the document validation service is further structured to determine whether the document includes a digital signature that corresponds to the digital certificate by attempting to cryptographically authenticate the digital signature of the document using the public key of the digital certificate.

9. The server system of claim 1, comprising:
    a rendering service structured to render the allowed print job and output a print data stream to the printer for printing if the signature corresponds to the certificate.

10. The server system of claim 1, wherein the document validation system is further structured to:
    determine whether the memory of the consumable includes a unique locking identifier; and if the memory does not include a unique locking identifier, disallow the print job to be printed on the printer.

11. The server system of claim 1, wherein the document validation service receives the document from a user who is not the content provider and sends the document to the printer.

12. The server system of claim 1, wherein the certificate management system is structured to generate and send the unique locking identifier to the printer for storage in the consumable memory if no unique locking identifier is stored in the consumable memory.

13. The server system of claim 1, wherein the certificate management system is structured to generate and send the unique locking identifier to the printer for storage in the consumable memory if a first content provider name stored in the consumable memory matches a second content provider name in the digital certificate.

14. The server system of claim 1, wherein the certificate management system is structured to allow the print job to be printed on the printer using the consumable if no unique locking identifier is stored in the consumable memory and the document does not include a digital signature.

* * * * *